(12) United States Patent
Aoshima

(10) Patent No.: US 8,760,735 B2
(45) Date of Patent: Jun. 24, 2014

(54) IMAGE COMBINING DEVICE AND IMAGE COMBINING METHOD

(75) Inventor: Takuma Aoshima, Kakegawa (JP)

(73) Assignee: NEC AccessTechnica, Ltd., Kakegawa-shi (JP)

( * ) Notice: Subject to any disclaimer, the term of this patent is extended or adjusted under 35 U.S.C. 154(b) by 1282 days.

(21) Appl. No.: 12/402,645

(22) Filed: Mar. 12, 2009

(65) Prior Publication Data

US 2009/0244651 A1     Oct. 1, 2009

(30) Foreign Application Priority Data

Mar. 27, 2008   (JP) ................. 2008-084093

(51) Int. Cl.
*H04N 1/04*     (2006.01)
*H04N 1/387*    (2006.01)
*H04N 1/40*     (2006.01)

(52) U.S. Cl.
USPC ........... 358/497; 358/474; 358/450; 358/449; 358/448; 358/443

(58) Field of Classification Search
USPC .......... 358/497, 474, 449–453; 382/284, 289, 382/294, 295, 297
See application file for complete search history.

(56) References Cited

U.S. PATENT DOCUMENTS

| | | | |
|---|---|---|---|
| 5,721,624 A * | 2/1998 | Kumashiro et al. | 358/450 |
| 6,507,415 B1 * | 1/2003 | Toyoda et al. | 358/450 |
| 6,690,482 B1 * | 2/2004 | Toyoda et al. | 358/1.2 |
| 6,975,434 B1 * | 12/2005 | Pilu et al. | 358/474 |
| 7,149,002 B2 * | 12/2006 | Clifton | 358/474 |
| 8,284,432 B2 * | 10/2012 | Migishima | 358/1.15 |
| 2009/0147285 A1 * | 6/2009 | Naruse | 358/1.9 |
| 2010/0149557 A1 * | 6/2010 | Naruse | 358/1.6 |
| 2010/0195156 A1 * | 8/2010 | Horiuchi | 358/1.16 |

FOREIGN PATENT DOCUMENTS

| | | |
|---|---|---|
| JP | 06-036009 A | 2/1994 |
| JP | 11-088655 A | 3/1999 |
| JP | 2000-188675 A | 7/2000 |
| JP | 2006-140868 A | 6/2006 |
| JP | 2006140868 A * | 6/2006 |
| JP | 2006-338584 A | 12/2006 |
| JP | 2006338584 A * | 12/2006 |

* cited by examiner

*Primary Examiner* — Cheukfan Lee
(74) *Attorney, Agent, or Firm* — Sughrue Mion, PLLC

(57) ABSTRACT

Disclosed is an image combining device includes a read unit and a control unit. The read unit includes a transparent holder and an image read section of flatbed type. The transparent holder holds a flat medium, and plural matching reference points are marked in an edge region. The image read section reads the medium placed on a reading window. A size of the medium is larger than the reading window. Each of the partial images, generated by the image read section, includes an image of a part of the medium and a part of the matching reference points. The matching reference points are arranged along a part of an edge of the image of the medium. The control unit combines the plural partial images based on the matching reference points included in the plural partial images, and generates a combined image including an image of the medium.

15 Claims, 15 Drawing Sheets

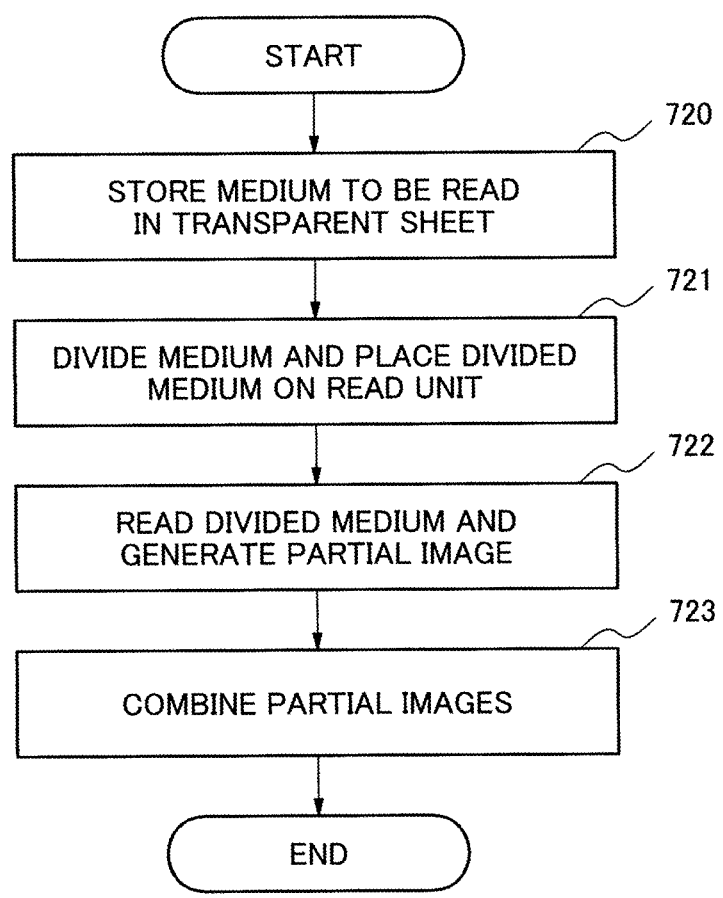

IMAGE COMBINING DEVICE AND IMAGE COMBINING METHOD

This application is based upon and claims the benefit of priority from Japanese Patent Application No. 2008-084093, filed on Mar. 27, 2008, the disclosure of which is incorporated herein in its entirety by reference.

TECHNICAL FIELD

The present invention relates to a device for combining images and a method for combining images.

BACKGROUND ART

A flatbed type image reading device has a read section for reading a medium to be read. When the medium to be read is set on the read section, the read section reads the medium to be read. In order for the image reading device to be provided as a product, the image reading device has to have features of low price and of portability. Therefore, a size of the read section provided in the image reading device is restricted. However, when such a small-sized read section is used, a size of the medium to be read is also limited, for example, a whole image of a large size sheet cannot be obtained. Accordingly, an image combining technology has been developed, so that a medium to be read having a larger size than the read section can be read. For this combining technology, a highly precise image combining process is required.

Japanese Patent Application Laid-open Publication No. 6-36009 discloses an image editing device. The image editing device includes image reading means, image editing means, storage means for storing an image after image editing and combining means. The image reading means reads an image of an original being within a predetermined read range, and outputs an image signal. The image editing means stores the read image, sets plural reference points on the image, and performs an image rotation process, an image enlarging process and an image reducing process. The combining means combines these images by referring to the reference points set on the image stored in the storage means and corresponding reference points set on each of the images, which are newly stored. When a size of an original to be read is larger than the size of the predetermined read range of the image editing device, the image editing device virtually divides the image of the original into smaller blocks, and the image reading means reads each of the virtually divided images of the original. The partial images read as above are combined each other by the storage means according to the reference points set on each of the partial images. As a result, an image of the original, a size of which is larger than the size of the predetermined reading range is stored in the storage means.

In the image editing device according to the related art, the reference points used for combining images is set after reading and storing the virtually divided images according to a mark which is set to the original before reading the original in advance.

Japanese Patent Application Laid-open Publication No. 11-88655 discloses an image processing apparatus in which plural images are separately inputted, and are joined. A single image is generated from the plural divided images. The image processing apparatus includes image input means for inputting an image, image storing means for storing data of the plural divided images which are outputted by the image input means, joint position determination means for determining a joint position for each scan line in the plural images and joint process means for performing a joint process to the plural images according to the joint position determined by the joint position determination means. In the image processing method in the related art, a correlation is evaluated for each pixel in the image areas that are read with respect to the images to be joined, and the joint position is determined.

Japanese Patent Application Laid-open Publication No. 2000-188675 discloses an image division input method used for an image input device in which an original on a platen is scanned and the image of the original is read. The image of the original whose size is larger than a size of a scan range is virtually divided into small blocks and each of the virtually divided images is read. In the image division input method of the related art, two scanning processes, i.e. a coarse scan and a fine scan, are performed. In a first coarse scan image obtained by the coarse scan, an area where a fine scan is performed and a connection area adjacent to the fine scan area are set. A second coarse scan area is obtained by performing the coarse scan in the area adjacent to the connection area. The fine scan area is definitively set by adjusting the position of the second coarse scan area and the position of the connection area. The combined image is obtained by repeating the above mentioned processes.

SUMMARY

An exemplary object of the invention is to provide an image combining device which combines images at high precision.

An image combining device according to an exemplary aspect of the invention includes a read unit and a control unit. The read unit includes a transparent holder and an image read section of flatbed type. The transparent holder holds a flat medium, and plural matching reference points are marked in an edge region. The image read section of flatbed type reads the medium held in the transparent holder placed on a reading window. A size of the medium is larger than a size of the reading window. The image read section generates plural partial images. Each of the partial images includes an image of a part of the medium and a part of the plural matching reference points. The matching reference points are arranged along a part of an edge of the image of the part of the medium. The control unit combines the plural partial images based on the matching reference points included in the plural partial images, and generates a combined image including an image of the medium.

An image combining method according to an exemplary aspect of the invention, to read a flat medium, a size of which is larger than a size of a reading window of an image read section of flatbed type, and to generate an image of the medium, the includes: storing the flat medium into a transparent holder, in which plural matching reference points are marked in an edge region; placing the transparent holder on the reading window; reading the medium held in the transparent holder, to generate plural partial images, each of which includes an image of a part of the medium and a part of the plural matching reference points, the matching reference points being arranged along a part of an edge of the image of the part of the medium; and combining the plural partial images based on the matching reference points included in the plural partial images, to generate a combined image including an image of the medium.

A transparent holder according to an exemplary aspect of the invention, to hold a flat medium, a part of which is read by an image read section of flatbed type, a size of the flat medium being larger than a size of a reading window of the image read section, includes plural matching reference points in an edge region. Plural partial images are generated, each of which includes an image of the part of the medium and a part of the plural matching reference points. The matching reference points are arranged along a part of an edge of the image of the part of the medium. The plural partial images are combined based on the matching reference points included in the plural partial images, to generate a combined image including an image of the medium.

A recording medium according to an exemplary aspect of the invention, records a program, which makes a computer execute a process to read a flat medium, a size of which is larger than a size of a reading window of an image read section of flatbed type, and to generate an image of the medium. The process includes: reading the flat medium held in a transparent holder, in which plural matching reference points are marked in an edge region, the transparent holder being placed on the reading window; generating plural partial images, each of which includes an image of a part of the medium and a part of the plural matching reference points, the matching reference points being arranged along a part of an edge of the image of the part of the medium; and combining the plural partial images based on the matching reference points included in the plural partial images, to generate a combined image including the image of the medium.

BRIEF DESCRIPTION OF THE DRAWINGS

Exemplary features and advantages of the present invention will become apparent from the following detailed description when taken with the accompanying drawings in which:

FIGS. 7A to 7C are flowcharts showing an example of an operation of the image combining device according to the first exemplary embodiment;

EXEMPLARY EMBODIMENT

Next, a detailed explanation will be given for a first exemplary embodiment with reference to the drawings.

(First Exemplary Embodiment)

An image combining device according to the first exemplary embodiment includes a flatbed type image reading device and a transparent holder. The image reading device has a read unit to read a medium to be read. The transparent holder includes a holding portion to hold the medium to be read, a size of which is larger than the size of the read unit, by e.g. inserting the medium to be read between two transparent sheets, or by overlapping a transparent sheet on the medium to be read. The transparent holder further includes an edge portion around the holding portion, in which matching reference points are marked. The positions of the points on the transparent holder are indicated with coordinates based on the matching reference points. The read unit virtually divides the medium to be read held in the transparent holder into small blocks, and read the virtually divided media to be read. The image reading device combines the read images and stores the data of the read images. The stored image data is used for a facsimile or printing purpose.

Figure 1A:
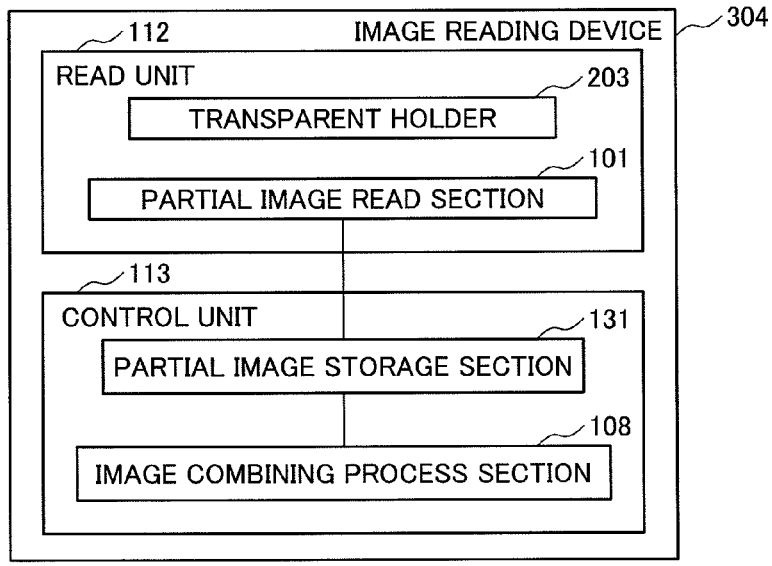
FIGS. 1A and 1B are block diagrams showing an example of an image reading device in an image combining device according to a first exemplary embodiment.

FIG. 1A shows an example of the image reading device of the first exemplary embodiment in which an original is virtually divided into two blocks and each of the blocks is read.

An image reading device 304 includes the above-mentioned read unit 112 and a control unit 113.

The read unit 112 includes a partial image read section 101 connected to the control unit 113. The control unit 113 includes a partial image storage section 131 connected to the partial image read section 101, and an image combining process section 108 connected to the partial image storage section 131.

An operation of the image reading device 304 is described below.

Figure 2:
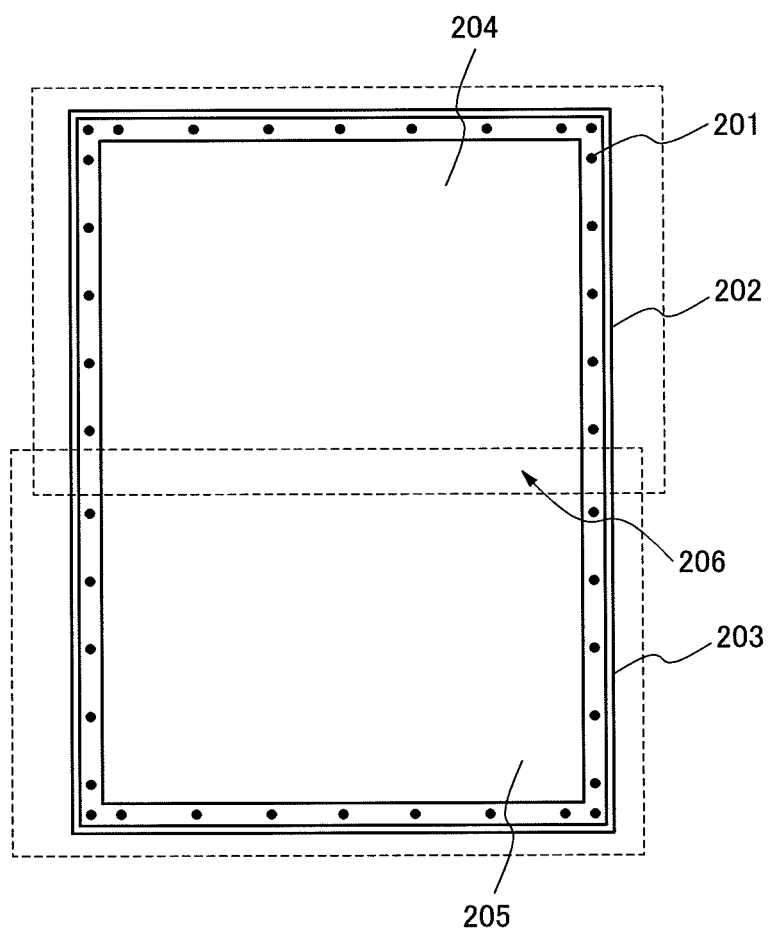
FIG. 2 shows an example of a transparent holder with matching reference points, in which a medium to be read is held, and a reading position in an image combining device according to the first exemplary embodiment.

The media to be read held in a transparent holder 203 are set on the read unit 112. The partial image read section 101 virtually divides the medium to be read held in the transparent holder 203 into small blocks. Each of the virtually divided media to be read is read. The partial image read section 101 generates plural partial images, each of which includes a part of the medium to be read 202 and matching reference points 201 around it, as shown in FIG. 2.

Specifically, for example, a partial portion of the medium to be read held in the transparent holder 203 is placed on the read unit 112 by a single reading operation, and a whole portion of the medium to be read is virtually divided into plural small blocks as virtually divided media to be read by plural times of reading operation.

Each of the virtually divided media to be read includes an overlapping portion that overlaps with the other divided media. The partial image read section 101 reads each of the virtually divided media to be read. A partial image in which the virtually divided medium to be read and the matching reference points around it are included is generated.

The partial image storage section 131 stores the partial image.

The image combining process section 108 reads out the partial image from the partial image storage section 131. The image combining process section 108 combines the partial images by referring to the matching reference points included in each of the partial images. The generated combined image includes the medium to be read and the matching reference points around it.

Figure 1B:
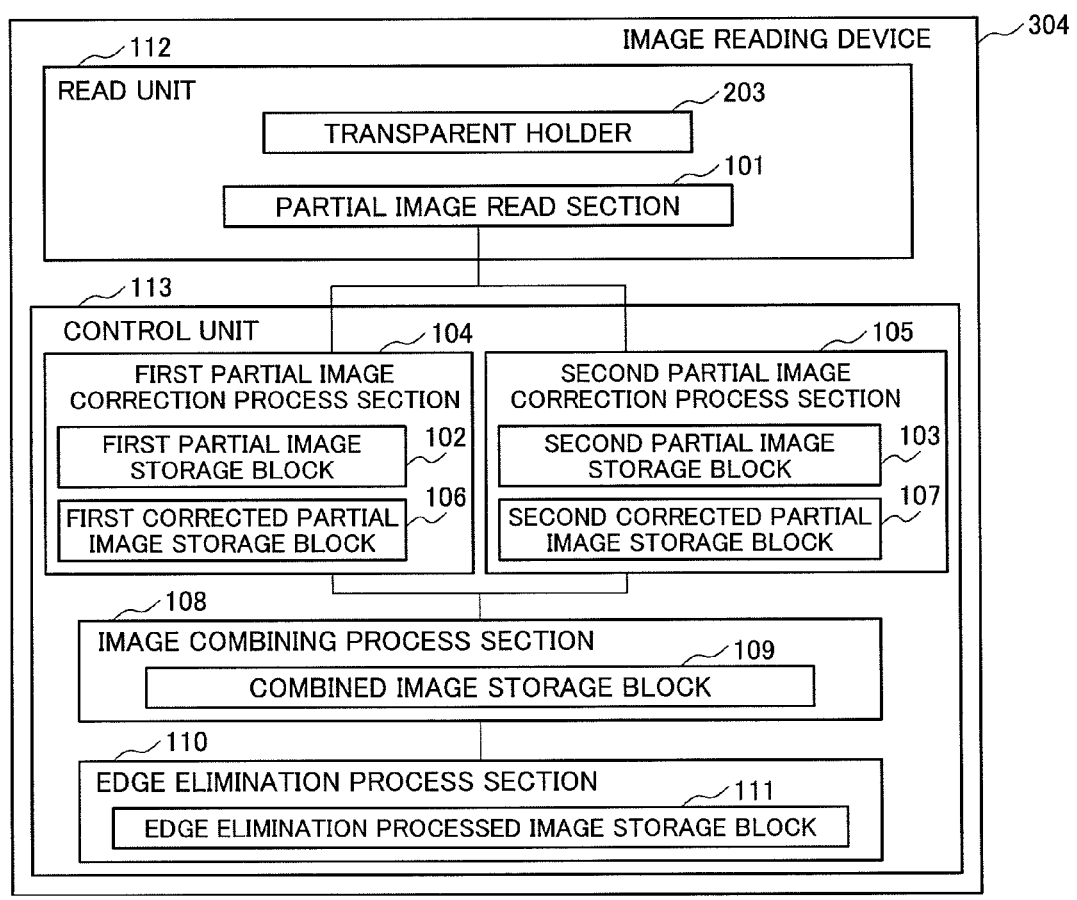

FIG. 1B shows another example of an image reading device of the first exemplary embodiment, in which an original is virtually divided into two blocks and each of the blocks is read. A process, in which two virtually divided images are stored in two partial image storage sections, will be described below.

The image reading device 304 includes the above-mentioned read unit 112 and the control unit 113.

The read unit 112 includes the partial image read section 101 connected to the control unit 113. The control unit 113 includes a first partial image correction process section 104 and a second partial image correction process section 105 that are connected to the partial image read section 101, an image combining process section 108 connected to the first partial image correction process section 104 and the second partial image correction process section 105, and an edge elimination process section 110 connected to the image combining process section 108. The first partial image correction process section 104 includes a first partial image storage block 102 and a first corrected partial image storage block 106. The second partial image correction process section 105 includes a second partial image storage block 103 and a second corrected partial image storage block 107. The image combining process section 108 includes a combined image storage block 109 and the edge elimination process section 110 includes an edge elimination processed image storage block 111. Further, the first partial image storage block 102, the first corrected partial image storage block 106, the second partial image storage block 103, the second corrected partial image storage block 107, the combined image storage block 109 and the edge elimination processed image storage block 111 may be arranged outside each of the correction process sections or the process section.

An operation of the image reading device 304 is described below.

The media to be read held in the transparent holder 203 is set on the read unit 112. The partial image read section 101 virtually divides the medium to be read held in the transparent holder 203 into small blocks. Each of the virtually divided media to be read is read. The partial image read section 101 generates plural partial images, each of which includes a part of the medium to be read and matching reference points 201 around it shown in FIG. 2.

Specifically, for example, a partial portion of the medium to be read held in the transparent holder 203 is placed on the read unit 112 by a single reading operation, and a whole portion of the medium to be read is virtually divided into plural small blocks as virtually divided media to be read (in this case, a first virtually divided medium to be read and a second virtually divided medium to be read).

Both of the first virtually divided medium to be read and the second virtually divided medium to be read include overlapping portions that overlap with each other. Then, the partial image read section 101 reads the first virtually divided medium to be read and the second virtually divided medium to be read. A first partial image is generated, which includes the first virtually divided medium to be read and the matching reference points around it. A second partial image is generated, which includes the second virtually divided medium to be read and the matching reference points around it.

The first partial image storage block 102 and the second partial image storage block 103 store the first partial image and the second partial image, respectively.

The first partial image correction process section 104 reads out the first partial image from the first partial image storage block 102. The second partial image correction process section 105 reads out the second partial image from the second partial image storage block 103. The first partial image correction process section 104 performs a tilt correction process (detailed description will be given later) in which the tilt of the first partial image is corrected and generates a first correction partial image. The second partial image correction process section 105 performs the tilt correction process in which the tilt of the second partial image is corrected and generates a second correction partial image.

The first corrected partial image storage block 106 has a storage area for storing the first correction partial image. The second corrected partial image storage block 107 has a storage area for storing the second correction partial image.

The image combining process section 108 reads out the first corrected partial image from the first corrected partial image storage block 106, and the second corrected partial image from the second partial image storage block 107. The image combining process section 108 combines the first corrected partial image and the second corrected partial image by referring to the matching reference points included in the first corrected partial image and the matching reference points included in the second correction partial image. By this image combining process (detailed description will be given later), the combined image including the medium to be read and the matching reference points around it is generated. Specifically, for example, in the image combining process, the image combining process section 108 refers to the matching reference points included in the overlapping portion between the first corrected partial image and the second corrected partial image and combines the first corrected partial image and the second correction partial image.

The combined image storage block 109 has a storage area for storing the combined image.

The edge elimination process section 110 reads out the combined image from the combined image storage block 109 and eliminates the matching reference points included in the combined image. By this edge elimination process, an edge elimination processed image is generated. Specifically, for example, the edge elimination process section 110 inserts a white image into an area including the matching reference points, in the image area including the combined image.

The edge elimination processed image storage block 111 has a storage area for storing the edge elimination processed image.

FIG. 2 shows the transparent holder 203 with the matching reference points, in which the medium to be read 202 is held as an example of the above-mentioned transparent holder, and shows an example of the read position of it. In FIG. 2, the medium to be read 202 is held in the holding portion of the transparent holder 203. A material, through which a visible light passes and which does not affect the medium to be read 202, when the read unit 112 reads the medium to be read 202 is used for the transparent holder 203. The above-mentioned matching reference points 201 are marked on the edge portion of the transparent holder 203. The matching reference points 201 represent coordinates for specifying a position of the medium to be read 202. The matching reference points 201 are used for the tilt correction process or the image combining process. The areas read by the read unit 112 of the image reading device 304, i.e. the first partial image 204 and the second partial image 205, are indicated with the dotted line in FIG. 2, when the medium to be read 202 is virtually divided into two blocks and the blocks are read. The area indicated with the dotted line is a read area of the read unit 112. An image in an area 206 near a joint portion at which the first partial image 204 and the second partial image 205 are joined is included both in the first partial image 204 and in the second partial image 205. The position of the matching reference points 201 will be described in detail in FIG. 4.

Figure 3:
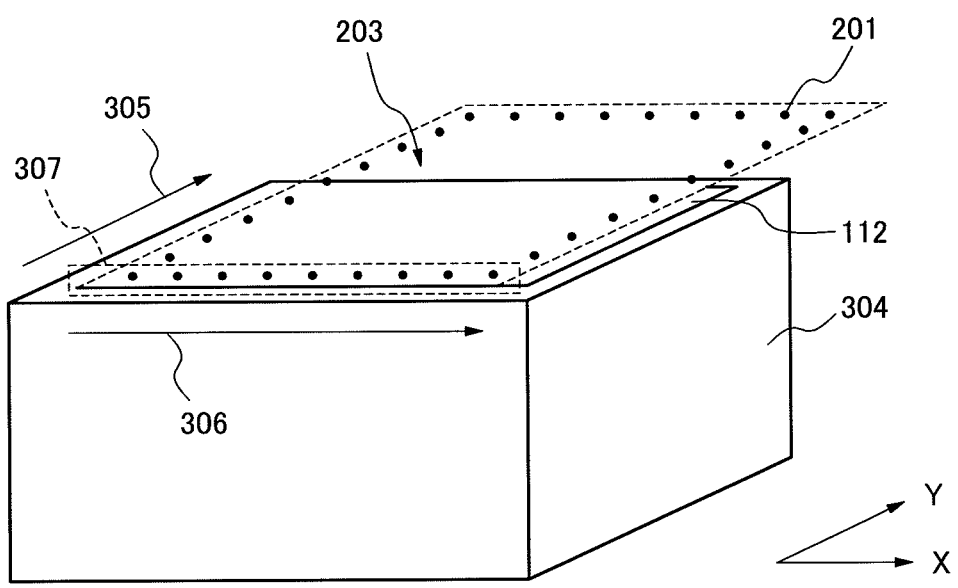
FIG. 3 shows an example of an operation for reading the medium to be read held in a transparent holder by an image reading device in an image combining device according to a first exemplary embodiment.

FIG. 3 shows an example of an operation for reading the medium to be read 202 that is held in the transparent holder 203 by the image reading device 304. FIG. 3 shows an example of a read out operation in a case that the size of the medium to be read 202 is about two times of the size of the reading window of the read unit 112. In FIG. 3, an x axis is taken in a sub scanning direction 306 of the read unit 112 and a y axis is taken in a main scanning direction 305 of the read unit 112. For example, assume that an image on a sheet of A3 size is read by the read unit 112 that can read a sheet up to A4 size. Further, when a rectangular medium to be read is read, a long side of it is set in the sub scanning direction and a short side of it is set in the main scanning direction. Data of an image is arranged in these directions.

When the medium to be read 202 held in the transparent holder 203 is set on the read unit 112, the read unit 112 reads the medium to be read 202. Because the read unit 112 cannot read by a single operation a whole image of an original, a size of which is larger than the size of the reading window of the read unit 112, a large size medium to be read 202 is virtually divided into small blocks, and each of the blocks is read. At that time, because the image in the area 206 near the joint portion has to be read two times, the length of the read unit 112 in the main scanning direction 305 has to be longer than half of the length of the long side of the medium to be read 202. In FIG. 2, the areas indicated with the dotted line, which indicate the first partial image 204 and the second partial image 205 after reading the images, represent the areas, in which the image is read by the read unit 112. In FIG. 3, an image obtained by reading a part of the medium to be read 202 currently set on the read unit 112 (the above-mentioned first virtually divided medium to be read) is defined as the first partial image 204, and an image obtained by reading a part of the medium to be read 202 which is not currently set on the read unit 112 (the above-mentioned second virtually divided medium to be read) is defined as the second partial image 205. When obtaining the second partial image 205, the transparent holder 203, in which the medium to be read 202 is held, is shifted in order to set the second virtually divided medium to be read on the read unit 112. At that time, a direction to read the transparent holder 203 in which the medium to be read 202 is held is set according to the structure of the image reading device 304. That is, because a rotation operation of the partial image generated by the reading in the tilt correction process after performing the image reading, a direction adjustment of the partial image may be needed in the image combining process according to the reading direction. Additionally, because the medium to be read 202 is manually set to the read unit 112 by a user, the medium to be read 202 may be placed at some angle to the read unit 112 or it may be placed on an undesired position. However, when reading the partial image, an area which includes half of the whole area of the medium to be read 202 and an area 206 near the joint portion is read as the first partial image 204 or the second partial image 205 as shown in FIG. 2. The image correction process and the image combining process are performed for these partial images, and the image of the medium to be read 202 is generated.

Figure 4:
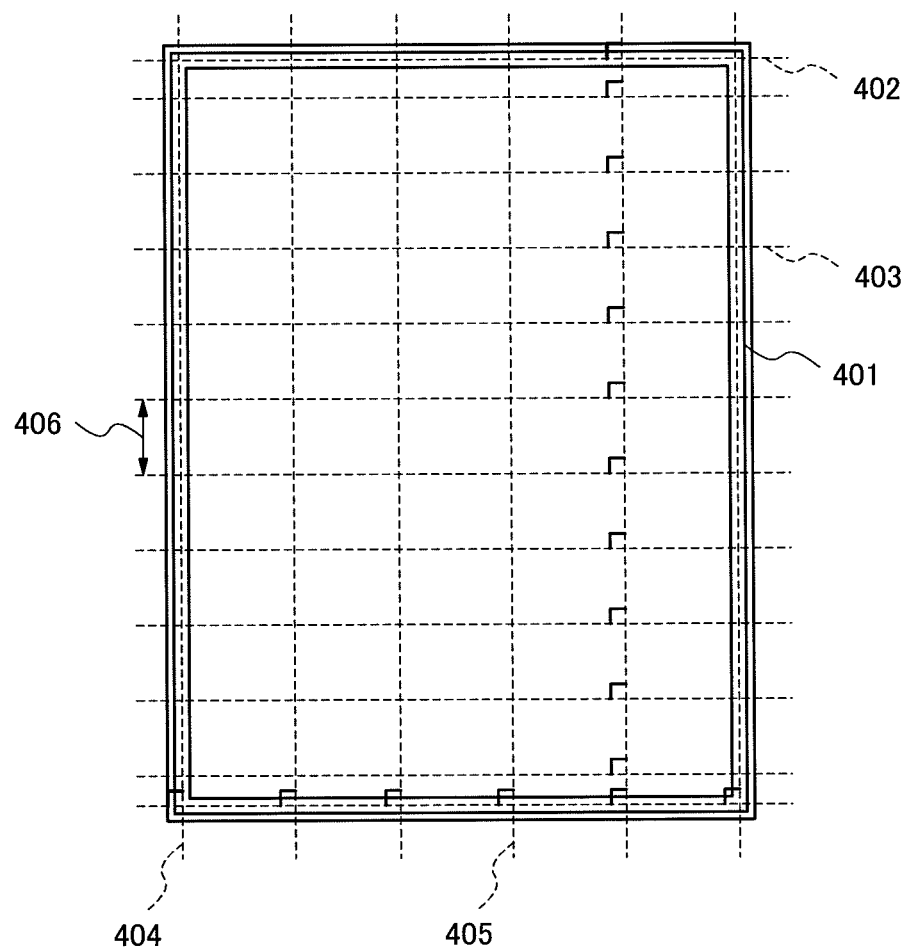
FIG. 4 shows an example of a position of matching reference points of the transparent holder in the image combining device according to the first and a second exemplary embodiments.

FIG. 4 shows an example of an arrangement of the matching reference points 201 in the transparent holder 203. In FIG. 4, all the matching reference points 201 are arranged on the edge portion 401 of the transparent holder 203. The matching reference points 201 on the edge portion 401, which is extended in a horizontal direction of a sheet among the matching reference points 201 shown in FIG. 2, are arranged in line and placed on a horizontal edge portion line 402. The matching reference points 201 on the edge, which is extended to a vertical direction of the sheet, are arranged in line and placed on a vertical edge portion line 404. The horizontal edge portion line 402 and the vertical edge portion line 404 are orthogonal to each other. A vertical direction line 405, which passes through the matching reference points 201 and is parallel to the vertical edge portion line 404, and a horizontal direction line 403, which passes through the matching reference points 201 and is parallel to the horizontal edge portion line 402, cross with each other at a right angle at intersecting points. Information on the number, the spacing and the position of the matching reference points is stored in the image reading device 304. A distance 406 between two central horizontal lines near the joint portion of two partial images is equal to a distance between the matching reference point 201 closest to a joint portion of the first partial image 204 and the matching reference point 201 closest to the joint portion of the second partial image 205, and it is used in the image combining process. The positions of the matching reference points 201 in the image reading device 304 are recognized based on the positions of the matching reference points 201 on the transparent holder 203, and on the information on the spacing between adjacent matching reference points that are stored in the image reading device 304 in advance. In an area where the matching reference points 201 are assumed to exist in the image including the partial image of the medium to be read 202 that is read by the read unit 112, a spacing between points and size of the points are detected. If these values correspond to those of the matching reference points stored in the image reading device 304, those points are recognized as the matching reference points 201. For example, in FIG. 3, using an arrangement device 307 by which the transparent holder 203 is placed at the corner of the read unit 112, the area in the image including the matching reference points 201 is defined. For the image reading device 304 having a function for identifying color, the matching reference points 201 may be colored with different colors with each other, and the image reading device 304 discriminates respective matching reference points 201 on the transparent holder 203. For example, the matching reference points 201 may be colored in different colors with each other, or the matching reference points 201 colored in red, blue and yellow may be arranged in order. Each of the corners of the transparent holder may be distinguished by the matching reference points at the corner, having different colors from each other. For the image reading device 304 not provided with the function for identifying color, the matching reference points 201 on the four corners of the transparent holder 203 may be recognized by shapes of the matching reference points, i.e. the shapes of the matching reference points 201 on the four corners may be different from each other or the distance between the edge portion lines may be different. For example, the matching reference points 201 may be marked with a "X" shape, an "O" shape, a "+" shape or a triangle shape.

Figure 5:
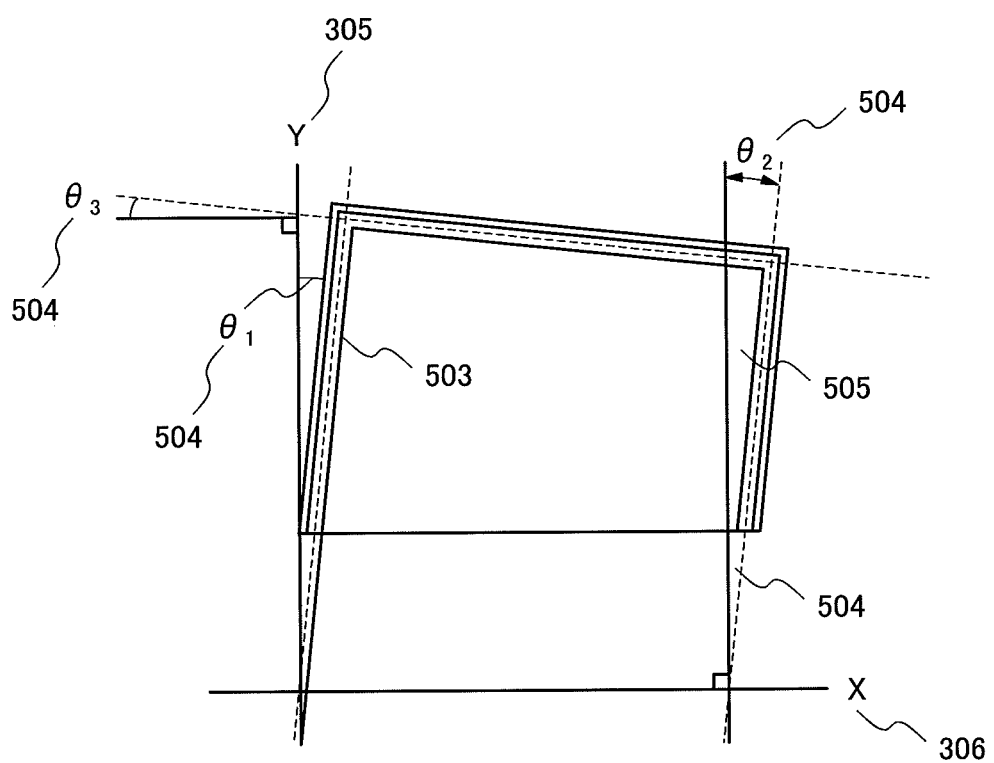
FIG. 5 shows a an example of a tilt correction process in the image combining device according to the first exemplary embodiment.

FIG. 5 shows an example of a tilt correction process mentioned above. In FIG. 5, an x axis is taken as the sub scanning direction 306 of the read unit 112 and a y axis is taken as the main scanning direction 305 of the read unit 112. An angle θ 1 between the vertical edge portion line 503 and the main scanning direction 305 is detected. The tilt correction process when the medium to be read 202 is set at some angle to the axis as shown in FIG. 2, is performed for the angle θ 1. In the tilt correction process, the tilt of a partial image 505 obtained by reading the medium to be read 202 is corrected. Any angle of the angles θ 1, θ 2 and θ 3 maybe used for the correction of the tilt 504 of the medium to be read 202. When each of the angles has an error, the correction may be performed for the average value of the angles θ 1, θ 2 and θ 3. When the main scanning direction and the sub scanning direction of the medium to be read need to be exchanged with each other, a rotation process is further performed.

Figure 6:
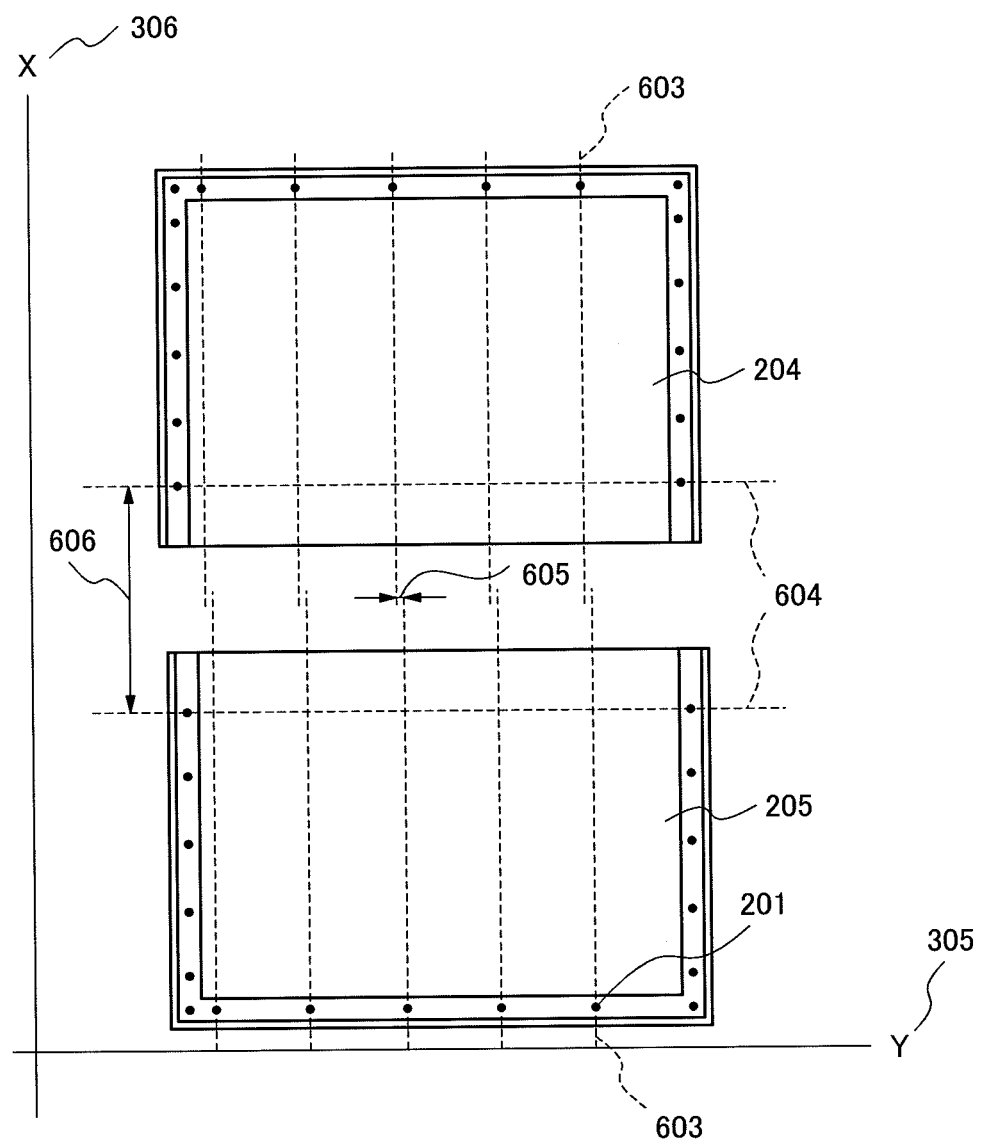
FIG. 6 is shows an example of a image combining process in the image combining device according to the first exemplary embodiment.

FIG. 6 shows an example of the combining process for two partial images that are corrected so that edge portions of the partial image become parallel to the x axis or the y axis by the tilt correction process shown in FIG. 5. In FIG. 6, the x axis is taken in the sub scanning direction 306 of the medium to be read and the y axis is taken in the main scanning direction 305 of the medium to be read. The main scanning direction 305 and the sub scanning direction 306 shown in FIG. 6 do not correspond to the main scanning direction and the sub scanning direction, respectively, as shown in FIG. 5. This is because the rotation by 90 degrees is performed in the tilt correction process. An image combining process performed in the image combining process section 108 in FIG. 1, in which the first partial image 204 and the second partial image 205 are combined, will be described. Each of the first partial image 204 and the second partial image 205 is moved to a suitable position by a parallel translation referring to the matching reference points 201, and two partial images are combined into one image. An x axis coordinate line 603 in the first partial image 204 passes the matching reference points 201 in the first partial image 204, and intersects with the y axis. Another x axis coordinate line 603 in the second partial image 205 passes the matching reference points 201 in the second partial image 205, and intersects with the y axis. The first partial image 204 and the second partial image 205 are moved in the y axis direction by a parallel translation so that a distance 605 between the x axis coordinate lines 603 in the first partial image 204 and the x axis coordinate line 603 in the second partial image 205 becomes zero. Additionally, the first partial image 204 and the second partial image 205 are moved in the x axis direction by the parallel translation so that a distance 606 between the y axis coordinate lines 604 in the first partial image 204 and the y axis coordinate line 604 in the second partial image 205 becomes equal to a distance 406 between two central horizontal lines in FIG. 4. When the distance 406 between two central horizontal lines shown in FIG. 4 is small, a problem may occur. That is, although the matching reference points 201 are included in the area bounded by two central horizontal lines that are spaced apart by the distance 406 in the first partial image 204, the matching reference points 201 may not be included in the area bounded by two central horizontal lines that are spaced apart by the distance 406 in the second partial image 205. For example, when the transparent holder 203 is placed at a position deviated from a predetermined position on the read unit on obtaining the second partial image, such problem as above may occur. Accordingly, the distance 406 between two central horizontal lines may be set taking account of the deviation of the position that occurs when the transparent holder 203 is placed on the read unit. When the distance 406 between two central horizontal lines is not used, a length of the parallel translation for the partial image in the x axis direction may be obtained from the position of the matching reference points 201 which are not included in the area bounded by two central horizontal lines spaced apart by the distance 406. Positional error for the matching reference points 201 when obtaining the partial image may be reduced by averaging distances obtained based on the plural matching reference points 201. The precision of the parallel translation is improved by this process.

In the image combining device according to the first exemplary embodiment, the matching reference points 201 are marked to the edge portion of the transparent holder 203. The medium to be read 202 held in the transparent holder 203 is set on the read unit 112 of the image reading device 304. The medium to be read held in the transparent holder 203 is virtually divided into small blocks and each of the virtually divided media is read by the read unit 112. The read unit 112 generates plural partial images 204 and 205, in which a part of the medium to be read and the matching reference points 201 around it are included. The control unit 113 combines the plural partial images 204 and 205 by referring to the matching reference points included in the plural partial images 204 and 205. A combined image including the original medium to be read and the matching reference points 201 around it is generated. Next, the control unit 113 eliminates the matching reference points 201 included in the combined image and generates an edge elimination processed image. By performing the processes mentioned above, the image combining process is performed with high precision.

[Operation]

FIG. 7A shows an example of an operation of the image combining device according to the first exemplary embodiment. When the image reading device 304 is instructed to execute an image combining process, it performs the image combining process. FIG. 7A shows a procedure from a start of the image combining process until the partial image is stored in the storage section 131 and the images are combined by the image combining process section 108.

The medium to be read 202 is held in the transparent holder 203 (Step 720), and an image reading process is started.

A virtually divided medium to be read is set on the read unit 112 (Step 721) as a part of the medium to be read 202 held in the transparent holder 203. The partial image read section 101 of the read unit 112 reads the virtually divided medium to be read, and generate a partial image 205, in which the virtually divided medium to be read and the matching reference points 201 around it are included (Step 722). The partial image read section 101 stores the partial image 205 in the partial image storage section 131.

The partial image 205 stored in the partial image storage section 131 is read out by the image combining process section 108, and the partial images are combined based on the image of the matching reference points 201 marked in the transparent holder 203 in the partial image 205 (Step 723). Further, the partial image storage section 131 stores the plural partial images 205 necessary for an image combining process. The image combining process ends.

Figure 7B:
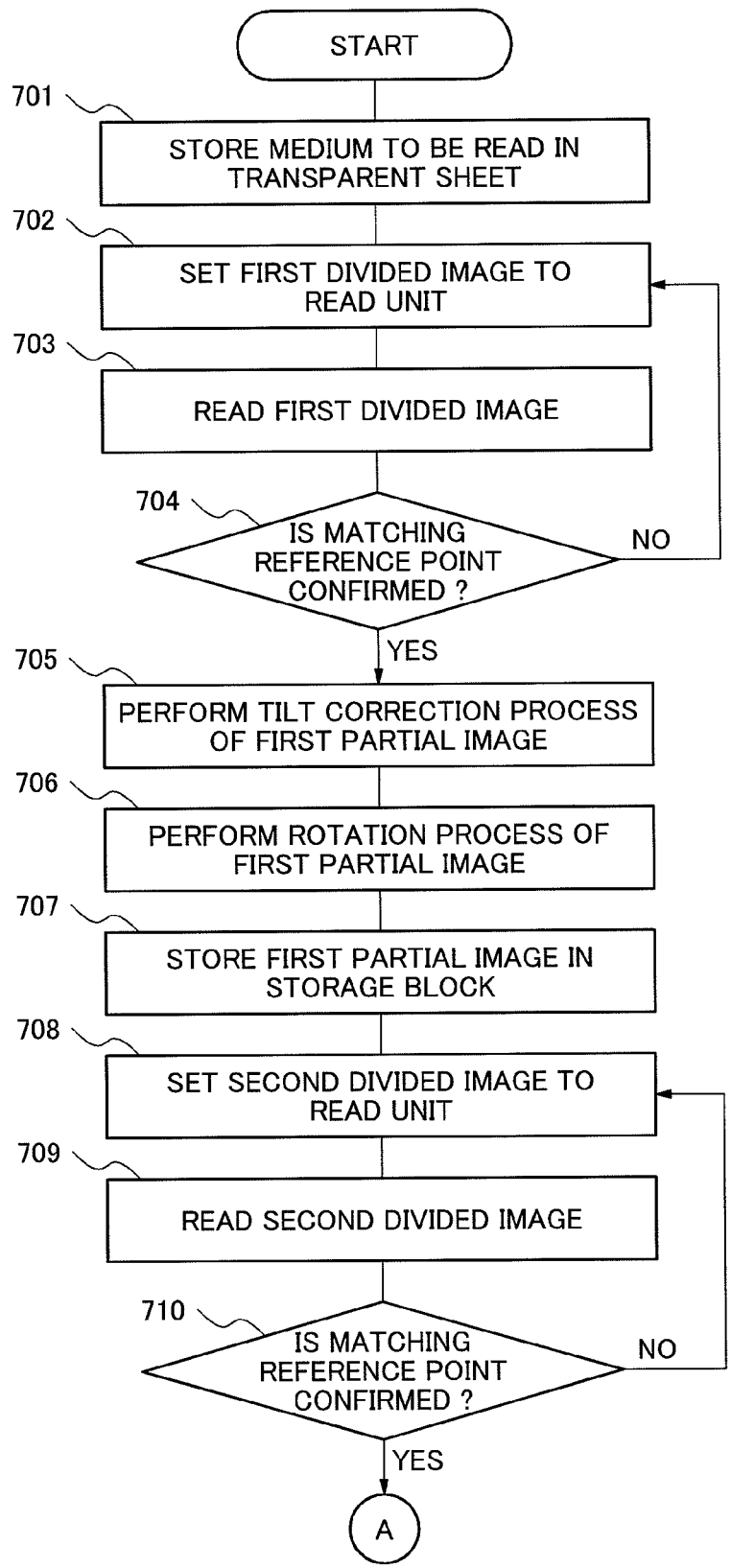
Figure 7C:
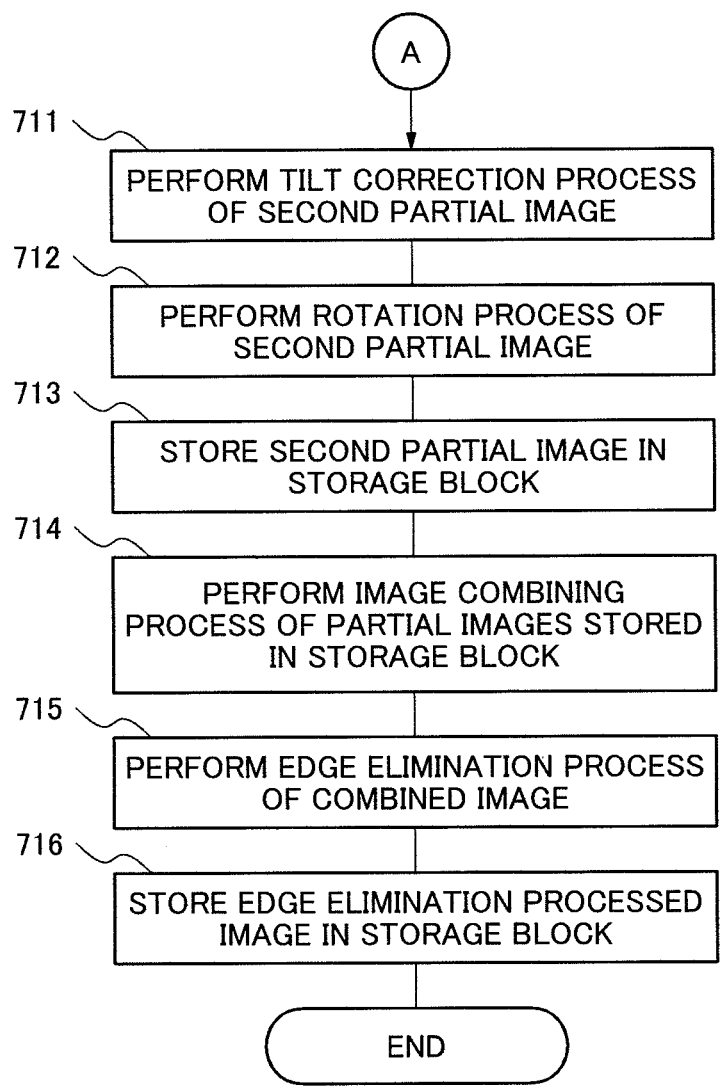

FIGS. 7B and 7C show the other examples of an operation of the image combining device according to the first exemplary embodiment. When the image reading device 304 is instructed to execute the image combining process, it performs the image combining process. FIGS. 7B and 7C show procedures from a start of the image combining process until the images are stored in the storage blocks 102, 103, 106, 107, 109 and 111. A process, in which two divided image data are stored in a partial image storage section that are divided into two parts, will be described below.

The medium to be read 202 is held in the transparent holder 203 and the image reading process is started (Step 701).

The first virtually divided medium to be read is set on the read unit 112 as a part of the medium to be read 202 held in the transparent holder 203 (Step 702). The partial image read section 101 of the read unit 112 reads the first virtually divided medium to be read, and generate a first partial image 205, in which the first virtually divided medium to be read and the matching reference points 201 around it are included (Step 703). The partial image read section 101 confirms whether or not the first partial image 205 includes the matching reference points 201 (Step 704). When the matching reference points 201 are not included in the first partial image according to a deviation from a correct position for the first virtually divided medium to be read ("NO" decision in step 704), the instruction for placing the first virtually divided medium to be read is issued again and the process in Step 702 is carried out. When the matching reference points 201 are included in the first partial image ("YES" decision in step 704), the partial image read section 101 stores the first partial image 205 in the first partial image storage block 102.

The first partial image correction process section 104 reads out the first partial image 205 from the first partial image storage block 102. The tilt of the first partial image 205 is corrected, and the first corrected partial image is generated (Step 705). In Step 705, as described in FIG. 5, the tilt, which was generated when the medium to be read 202 was read, is detected according to the matching reference points 201. When the tilt correction process ends, the first partial image correction process section 104 rotates the first partial image (Step 706). Because the main scanning direction and the sub scanning direction of the image when the image is read do not correspond to those of the image generated by the image combining process, respectively, the image has to be rotated by 90 degrees clockwise or counterclockwise. After the rotation process is completed, the first partial image correction process section 104 stores the first partial image in the first corrected partial image storage block 106 (Step 707).

Next, the transparent holder 203 that is set to the read unit 112 is moved. The second virtually divided medium to be read is set on the read unit 112 as a part of the medium to be read 202 held in the transparent holder 203 (Step 708). The partial image read section 101 of the read unit 112 reads the second virtually divided medium to be read and generate a second partial image 204 in which the second virtually divided medium to be read and the matching reference points 201 around it are included (Step 709). The partial image read section 101 confirms whether or not the matching reference points 201 are included in the second partial image 204 (Step 710). When the matching reference points 201 are not included in the second partial image ("NO" decision in step 710), the instruction for placing the second virtually divided medium to be read is issued again and the process in Step 708 is carried out. When the matching reference points 201 are included in the second partial image ("YES" decision in step 710), the partial image read section 101 stores the second partial image 204 in the second partial image storage block 103.

The second partial image correction process section 105 reads out the second partial image 204 from the second partial image storage block 103. The tilt of the second partial image 204 is corrected and the second corrected partial image is generated (Step 711). In Step 711, as described in FIG. 5, the tilt, which was generated when the medium to be read 202 was read, is detected according to the matching reference points 201. When the tilt correction process ends, the second partial image correction process section 105 rotates the second partial image (Step 712). After the rotation process is completed, the second partial image correction process section 105 stores the second partial image in the second corrected partial image storage block 107 (Step 713).

The image combining process section 108 reads out the first corrected partial image from the first corrected partial image storage block 106, and reads out the second corrected partial image from the second partial image storage block 107. The image combining process section 108 generate a combined image including the medium to be read and the matching reference points 201 around it by combining the first corrected partial image and the second corrected partial image by referring to the matching reference points 201 included in the overlapping portion, in which the first corrected partial image and the second corrected partial image overlap (Step 714). The image combining process has been described in detail with reference to FIG. 6. In Step 714, the image combining process section 108 stores the combined image in the combined image storage block 109.

The edge elimination process section 110 reads out the combined image from the combined image storage block 109. The edge elimination process section 110 eliminates the matching reference points 201 included in the combined image by inserting a white image in an image area including the matching reference points 201 in the image area of the combined image and generates an edge elimination processed image (Step 715). In Step 715, the edge elimination process section 110 stores the edge elimination processed image in the edge elimination processed image storage block 111 as an image for output (Step 716). The image combining process ends.

(The Second Exemplary Embodiment)
[Configuration]

An image combining device according to a second exemplary embodiment will be described. Hereafter, an explanation in the second exemplary embodiment overlapping with the first exemplary embodiment is omitted.

The basic configuration of the exemplary embodiment is the same as the configuration of the first exemplary embodiment. The exemplary embodiment has the feature of which a capacity of the storage medium can be used effectively. An amount of data of the image read out by the read unit is generally large. When an image is not compressed, a large capacity is required for a memory to store image information. In the exemplary embodiment, the image is compressed and stored. Moreover, a pre-reading is performed and a correction value is calculated according to positions of the detected matching reference points. By performing these processes, the storage capacity required for reading the partial image, and for storing the image data in the storage medium can be suppressed. These processes will be described below. The position of the matching reference points in the transparent holder is the same as that of the first exemplary embodiment.

Figure 8:
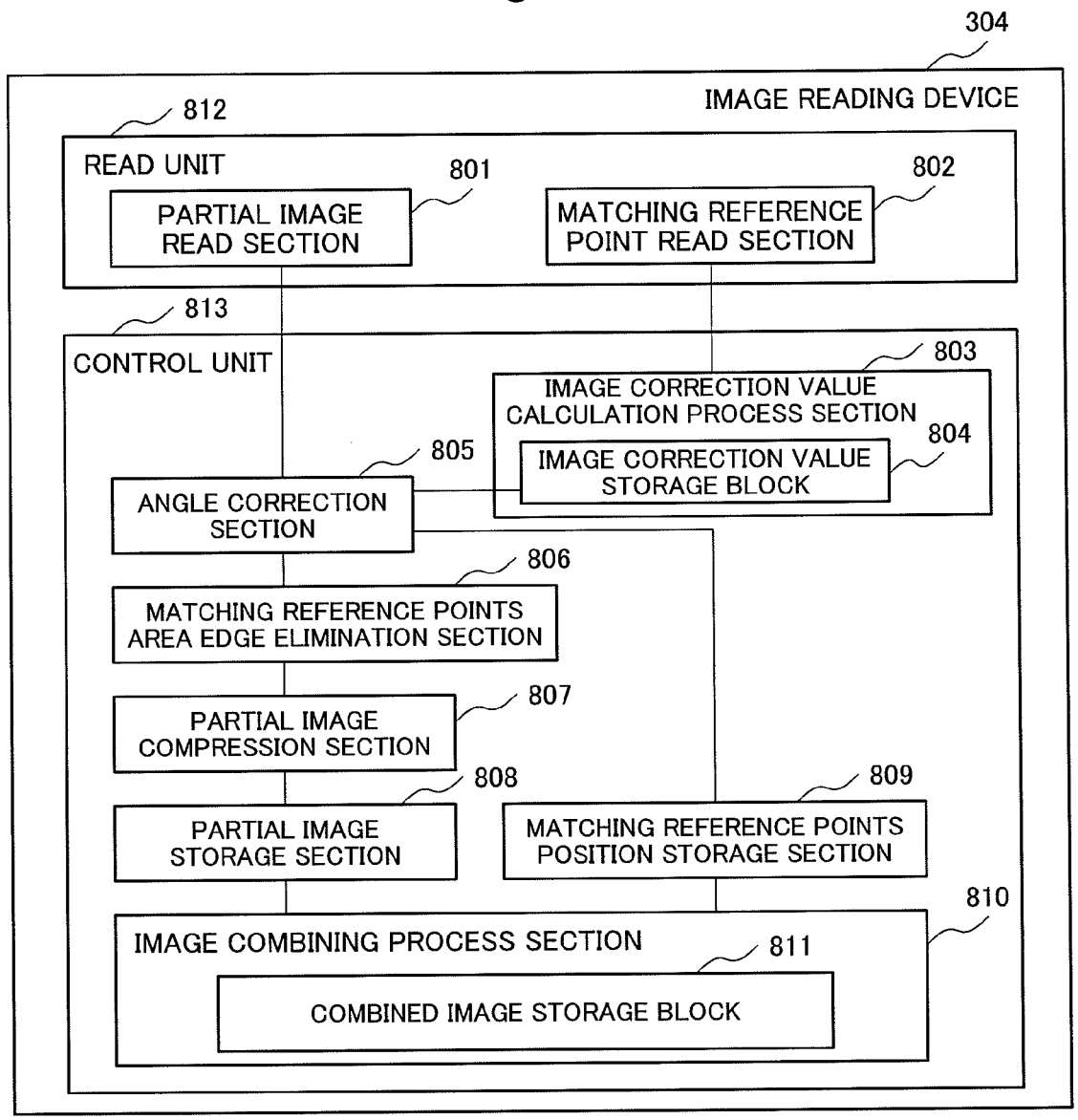
FIG. 8 is a block diagram showing an example of the image reading device in the image combining device according to a second exemplary embodiment.

FIG. 8 shows an example of the image reading device 304 in the image combining device according to the second exemplary embodiment.

The image reading device 304 includes a read unit 812 and a control unit 813.

The read unit 812 includes a partial image read section 801 and a matching reference point read section 802, and both are connected to the control unit 813. The control unit 813 includes an image correction value calculation process section 803, an angle correction section 805, a matching reference point area edge elimination section 806, a partial image compression section 807 and an image combining process section 810.

The control unit 813 includes a partial image storage section 808 and a matching reference point position storage section 809. The image correction value calculation process section 803 includes the image correction value storage block 804, and the image combining process section 810 includes a combined image storage block 811.

The read unit 812 reads the partial image twice. That is, when the partial image is placed on the read unit 812, the partial image read section 801 reads the partial image, and the matching reference point read section 802 reads the matching reference points.

The read unit 812 cannot read the medium to be read held in the transparent holder by a single operation. Therefore, the medium to be read is virtually divided into small blocks, and each of the blocks of the medium to be read is read by the read unit 812 in several times. First, a part of the medium to be read held in the transparent holder is virtually divided into plural small blocks as virtually divided media to be read, and the virtually divided media are set on the read unit 812. In the exemplary embodiment, the medium to be read is virtually divided into four blocks, i.e. first to fourth virtually divided medium to be read. However, the number of blocks is not limited to four. In a first reading process to each of the virtually divided media to be read, the position of the matching reference points are preliminarily read by the matching reference point read section 802 of the read unit 812. By this process, matching reference point location information, which represents the position of the matching reference points in the virtually divided medium to be read, is obtained. The matching reference point location information is obtained, for example, as a coordinate value. In the second reading process, the whole partial image including the matching reference points are obtained by the partial image read section 801 of the read unit 812. When the virtually divided medium to be read is read, the partial image, including the virtually divided medium to be read and the matching reference points around it is generated. The reading process is performed twice for each of all virtually divided media to be read and the partial image in which the virtually divided medium to be read and the matching reference points around it are included is generated for each of all the virtually divided media to be read. In the exemplary embodiment, these partial images are the first to fourth partial images.

The image correction value calculation process section 803 calculates an angle between the edge portion and the scanning direction when the virtually divided media to be read is set on the read unit 812 for each of the virtually divided media to be read according to the matching reference point location information obtained by the first reading process. The correction value is calculated for each of the virtually divided media to be read according to the calculated angle So that the tilt angle between the virtually divided media to be read and the scanning direction is reduced to be zero. In the exemplary embodiment, the correction values are first to fourth correction values.

The image correction value storage block 804 stores the above-mentioned correction values.

The angle correction section 805 corrects the tilt of the each partial image according to the correction value stored in the image correction value storage block 804, and generates a correction partial image. In the exemplary embodiment, the correction partial images are first to fourth correction partial images. This correction process is performed according to the tilt 504 of the medium to be read by using the same process as shown in FIG. 5. Because the matching reference points are eliminated from the corrected partial image in the edge elimination process by the matching reference points area edge elimination section 806 in the next step, the angle correction section 805 has to store the position of the matching reference points beforehand. That is, information for discriminating the corrected partial image includes information on the position of the matching reference points in the correction partial image.

The matching reference points position storage section 809 associates the information for discriminating the above-mentioned corrected partial image with the information on the position of the matching reference points included in the above-mentioned corrected partial image, and stores them.

The matching reference points area edge elimination section 806 performs the edge elimination process to the corrected partial image and generate an edge elimination processed image. That is, an image area including the matching reference points in the corrected partial image is overwritten with a white image, and the matching reference points included in the combined image are eliminated. At that time, the matching reference points area edge elimination section 806 performs the edge elimination process to an image area which is bounded by the horizontal edge portion line 402, and the line that is parallel to the horizontal edge portion line 402 and separated from it by a predetermined length, and an image area which is bounded by the vertical edge portion line 404 and the line parallel to the vertical edge portion line 404 and separated from it by a predetermined length, as shown in FIG. 4. By making the above lengths for all partial images the same, deviation of the image of the edge portion that is generated by combining the partial images from a correct position in the subsequent step can be avoided. In the exemplary embodiment, the edge elimination processed images are first to fourth edge elimination processed images.

The partial image compression section 807 compresses each of the edge elimination processed images and generates a compressed image. The flatbed scanner performs the reading for each main scanning line. Therefore, in the exemplary embodiment, it is necessary to perform an image processing after reading the image of several lines, and compress the image for each line or several lines. As far as the above requirement is met, any compression format maybe adopted. In the exemplary embodiment, the compressed images are first to fourth compressed images.

The partial image storage section 808 stores the compressed image.

The image combining process section 810 decompresses the compressed image stored in the partial image storage section 808 as the edge elimination processed image. The image combining process section 810 combines the edge elimination processed images by referring to an overlapping portion, in which the edge elimination processed image and the other edge elimination processed image overlap based on the position of the matching reference points included in the corrected partial image stored in the matching reference points position storage section 809. By the image combining process, the combined image including the medium to be read and the matching reference points around it is generated. In the image combining process, a value for the parallel translation of the image stored in the partial image storage section 808 is calculated according to the information on the position stored in the matching reference point position storage section 809. By performing the parallel translation based on the value obtained as above, an image combining is performed and the combined image is generated.

The combined image storage block 811 has a storage area for storing the combined image.

The medium to be read is virtually divided into four blocks. The four blocks are read and the read images are stored in the partial image storage section 808 and the matching reference points position storage section 809. Therefore, four images and the position of the matching reference points are stored in them. A method for storing a position coordinate and an image combining method used by the matching reference points position storage section 809 will be described by referring to FIGS. 10A to 11.

In the exemplary embodiment, in order to use the capacity of the storage block effectively, the process is performed for each line. The matching reference points read section 802 detects the matching reference points in the first reading process. The tilt of the image is detected according to the matching reference points. The image correction value calculation process section 803 calculates a correction value, and the image correction storage block 804 stores the correction value. The partial image read section 801 reads the image by a second reading. When the image reading is performed, the angle correction section 805 corrects the angle of the image for every several lines, and the matching reference points area edge elimination section 806 performs the edge elimination process for the area including the matching reference points. The partial image compression section 807 performs a compression of the image in the line to which the process is completed. The compressed image is stored in the partial image storage section 808. Because the image before compression is compressed to several lines, a capacity of the storage block that is used after reading the image may be reduced.

Figure 9:
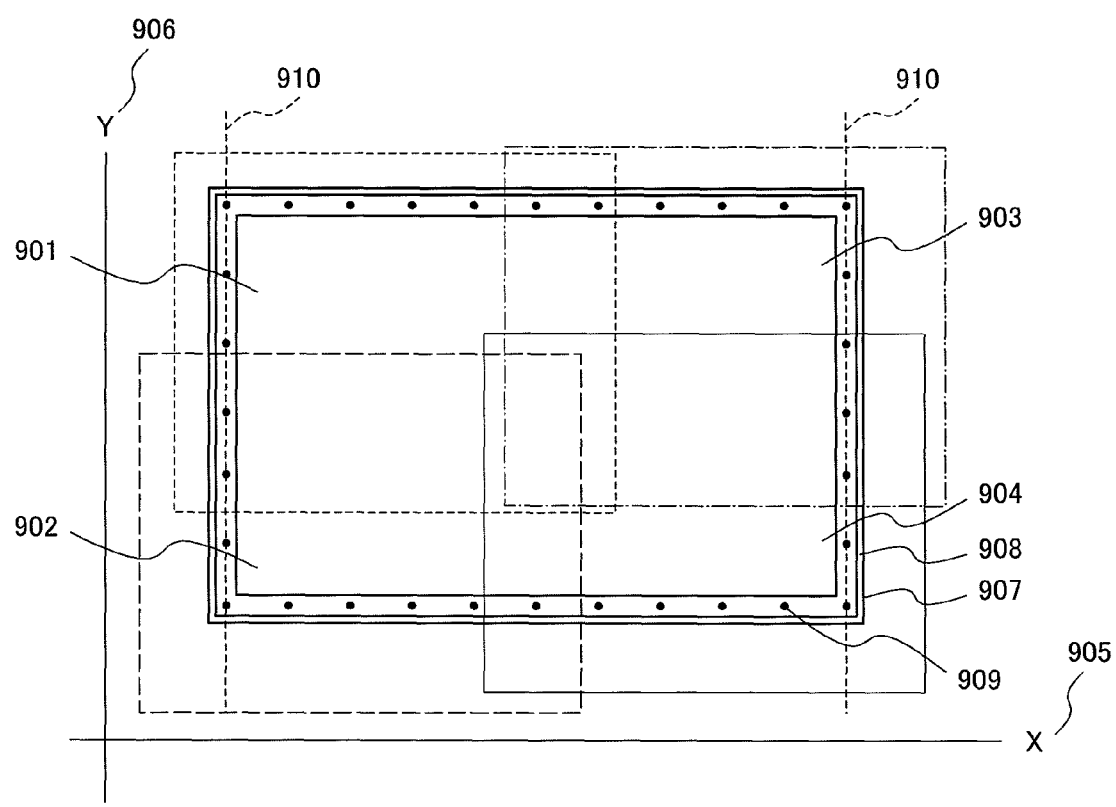
FIG. 9 shows an example of a transparent holder with matching reference points, in which the medium to be read is held and a reading position in the image combining device according to the second exemplary embodiment.

FIG. 9 shows an example of a transparent holder 907 with a matching reference points 909, in which a medium to be read 908 is stored. The reading position of the medium to be read 908 is indicated. In FIG. 9, the positions of the matching reference points 909 of the transparent holder 907 are the same as the positions of the matching reference points shown in FIG. 4. In the exemplary embodiment, the medium to be read 908 is held in the transparent holder 907, and the read unit 812 obtains a partial image. When the size of the read area of the read unit 812 is half of the size of the medium to be read 908, the image to be read is virtually divided into two blocks, each of the virtually divided images is read, and the read images are combined as shown in FIG. 2 in the first exemplary embodiment. However, in the first exemplary embodiment, the main scanning direction and the sub scanning direction for reading the partial image are different from the main scanning direction and the sub scanning direction for reading the image after image combining by 90 degrees rotation, respectively. For this reason, the image has to be rotated by 90 degrees. Because a storage area capable of storing two images is required for performing the rotation process, when the amount of data of the read image is large, a storage medium with a large capacity is required for performing the rotation process of the image. As a result, this increases the cost.

In the exemplary embodiment, the reading of the partial image is performed so that the main scanning direction and the sub scanning direction for reading the partial image are the same as the main scanning direction and the sub scanning direction for reading the image after image combining, respectively. Therefore, it is not necessary to rotate the image. The increasing cost can be avoided. FIG. 9 shows an example of a process, in which the medium to be read is virtually divided into four blocks, and each of the virtually divided images is read, to obtain a first partial image 901, a second partial image 902, a third partial image 903, and a fourth partial image 904, and each of the divided images is read. In this process, the rotation process is not required and the read data is compressed for each line. Therefore, the storage capacity required for performing the process becomes small. In order to read the partial image, the storage capacity capable of storing an area including one-quarter of the transparent holder 907, with a width for one line of the matching reference points arranged in the vertical direction and with a width for one line of the matching reference points arranged in the horizontal direction, is required. In FIG. 9, the x axis is taken in the sub scanning direction 905 of the read unit 812, and the y axis is taken in the main scanning direction 906 of the read unit 812. In the first reading process, the matching reference points read section 802 reads the matching reference points 909. An image of a neighboring area of an edge portion line 910 is read for each partial image. The tilt of the partial image is calculated by using the same process as shown in FIG. 5. Because an read area is limited to the neighboring area of the edge portion line, an area used for storage is suppressed. If a condition, in which the edge of the read area of the read unit 812 and the edge of the transparent holder 907 overlap with each other when reading the image, is added, the detection of the position of the matching reference points 909 becomes easier.

The image combining process section 810 combines the images stored in the partial image storage section 808 according to the location information on the matching reference points 909 stored in the matching reference points position storage section 809 shown in FIG. 8. When four images are combined, the images in the main scanning direction are combined first. That is, in FIG. 9, the first partial image and the second partial image are combined, then the third partial image and the fourth partial image are combined. The line in the main scanning direction of the first partial image and the line in the main scanning direction of the second partial image are combined by referring to the matching reference points included in each partial image. The combined line is in the main scanning direction of the combined image. Because the partial image compressed by the partial image compression section 807, data on the line to be combined is decompressed for each partial image and those data are combined. The length of parallel translation for the partial image is calculated by using the matching reference point coordinate information stored in the matching reference point position storage section 809. The line to be combined for each partial image is selected taking account of the length. The matching reference point position storage section 809 stores the position coordinates of all the matching reference points 909. The length of parallel translation for each partial image is calculated so that the same matching reference points 909 in the partial images to be combined overlap with each other by the parallel translation.

Figure 10A:
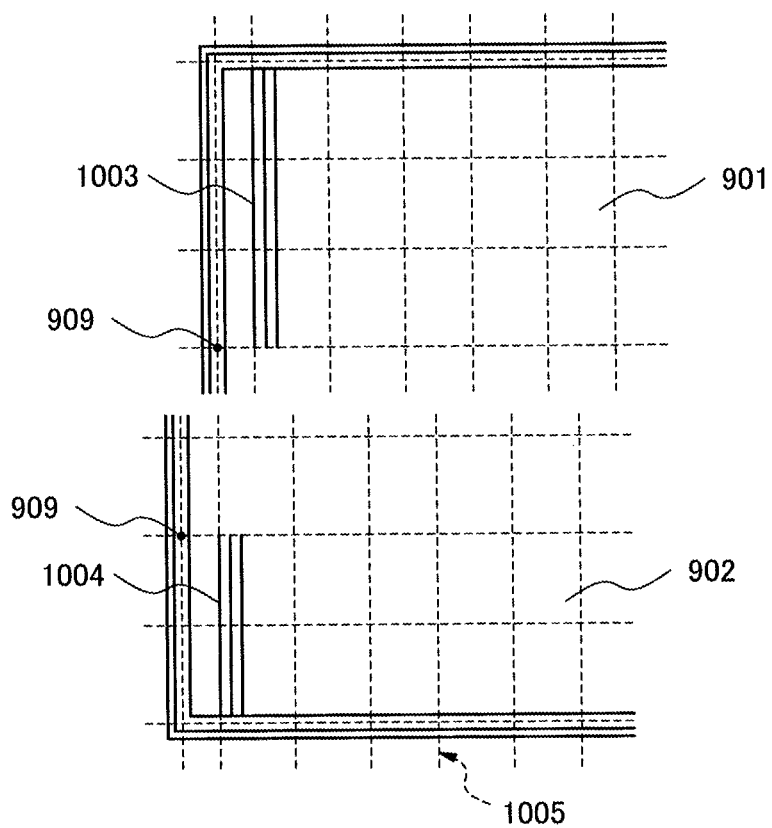
FIG. 10A and 10B show examples of the image combining process in the image combining device according to the second exemplary embodiment.

FIG. 10A shows an example of the image combining process for each line of the first partial image and the second partial image. Although the edge portion of the first partial image 901 and the edge portion of the second partial image 902 are eliminated when the images are combined, because the coordinate of the matching reference points 909 is stored in the matching reference point position storage section 809 shown in FIG. 8, the edge portion is included in FIGS. 10A and 10B for understanding the combining process.

Usually, the decompression process is performed for each line or plural lines. A portion 1003 used for the combining among the decompression lines in the first partial image, and a portion 1004 used for the combining among the decompression lines in the second partial image are combined. The combined data is compressed again. When plural lines are required for the compression process, the decompression process and the compression process are performed for every plural lines. At that time, the matching reference points 909 are used as marks for reading a line in the first partial image 901 and a line in the second partial image 902. That is, the positions of the coordinates in the main scanning direction (a vertical direction of a sheet) of the matching reference points 909 included in each of the partial images are used as borders and a line of the image is read. The third partial image 903 and the fourth partial image 904 shown in FIG. 9 are also combined by the same process mentioned above.

Figure 10B:
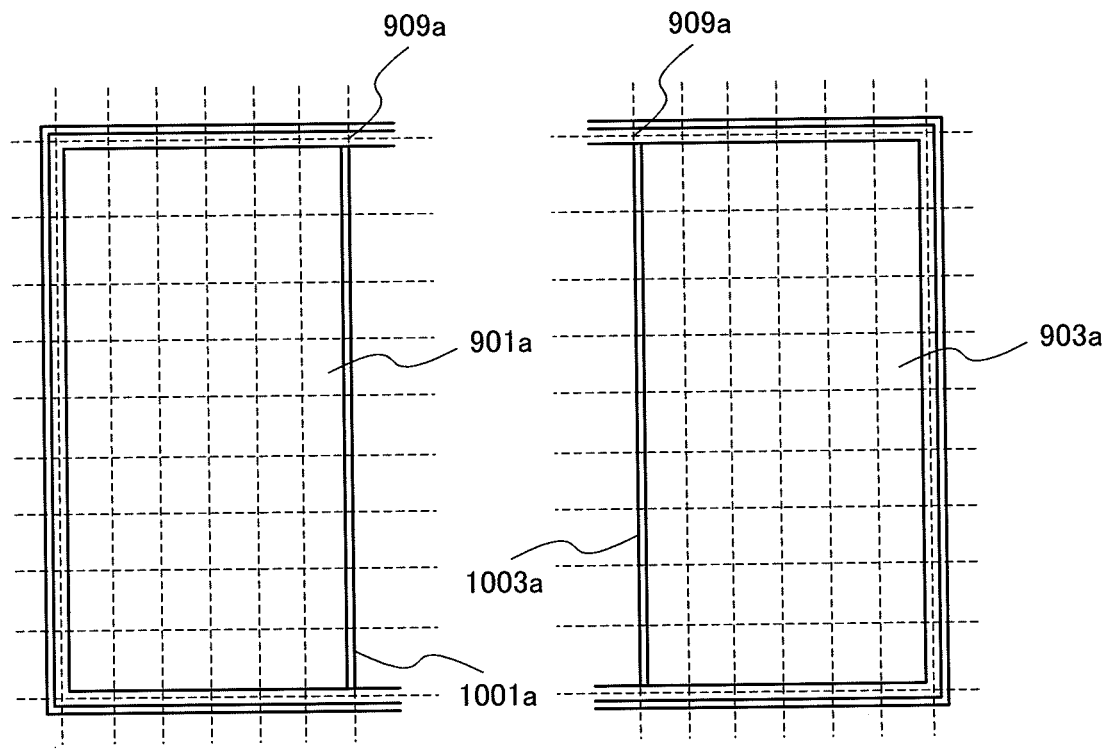

FIG. 10B shows an example of a process for combining the image 901a obtained by combining the first partial image 901 and the second partial image 902, and the image 903a obtained by combining the third partial image 903 and the fourth partial image 904. At that time, the combining process is performed by using the lines 1001a and 1003a, which pass the position of the coordinate in the sub scanning direction (a horizontal direction of a sheet) of the common matching reference points 909a in two images as a border. When the decompression of the compression format is required for every several lines to obtain a boundary based on the matching reference points 909a, an area of the boundary is decompressed and the combining is performed. When the decompression is not required, the combining is performed. Unnecessary image data on the overlapping portion is eliminated. Four images are combined by using the above method.

Figure 11:
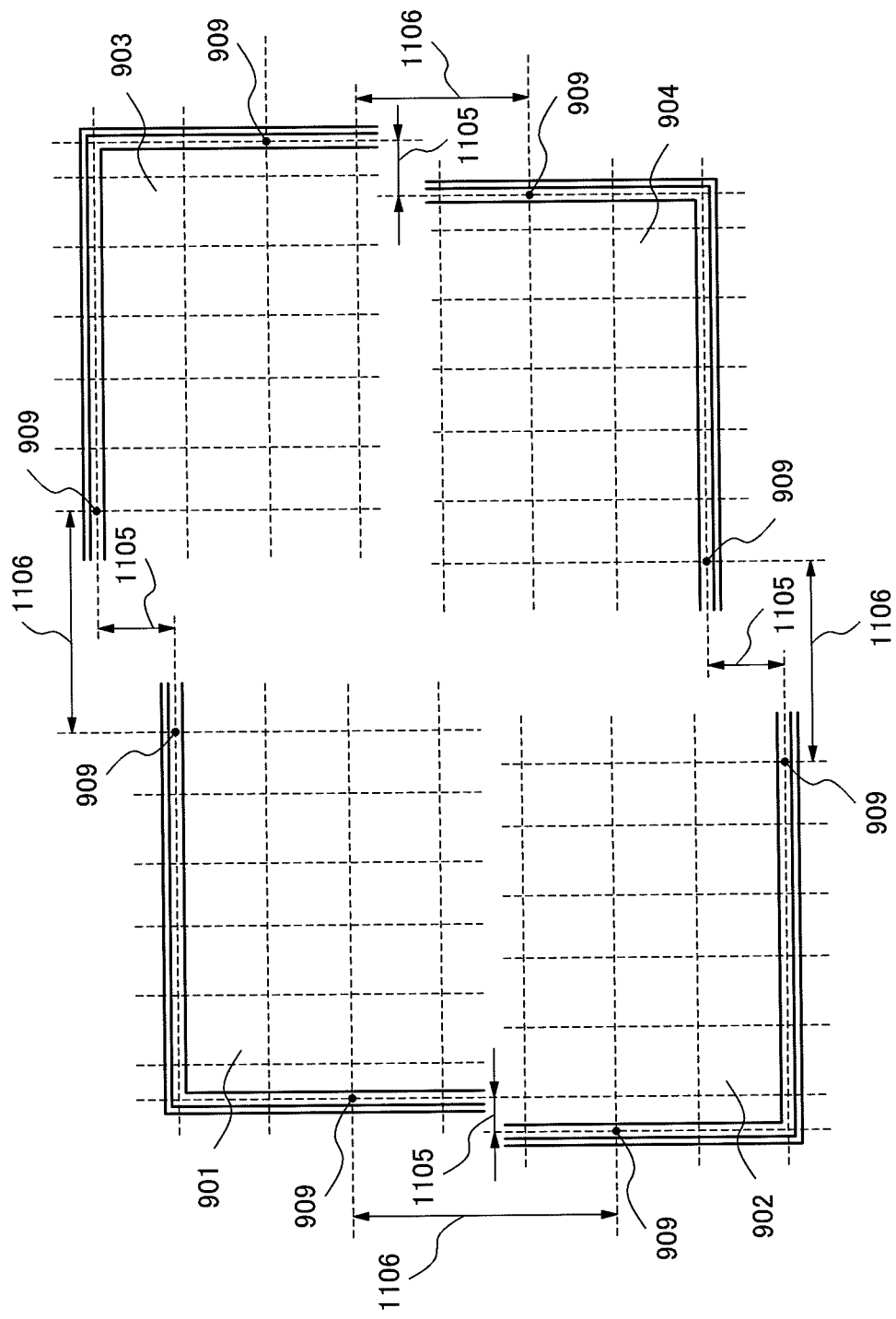
FIG. 11 shows an example of another method of the image combining process in the image combining device according to the second exemplary embodiment.

FIG. 11 shows another example of an image combining process. A length of moving required for performing the parallel translation of the four divided partial images to combine them is calculated. In FIG. 11, an image to be read is virtually divided into four blocks, and each of the virtually divided images is read to obtain a first partial image 901, the second partial image 902, the third partial image 903 and the fourth partial image 904. The distance 1105 and the distance 1106 are the distance between the matching reference points 909 of the two images in the horizontal scanning direction and the vertical scanning direction, respectively. Four partial images are moved by the parallel translation so that the distance 1105 becomes zero. Additionally, four partial images are moved by the parallel translation so that the distance 1106 becomes the spacing between the adjacent matching reference points in the transparent holder 907, and those images are combined. In this way, the length of the parallel translation is calculated in the image combining process.

[Operation]

Figure 12:
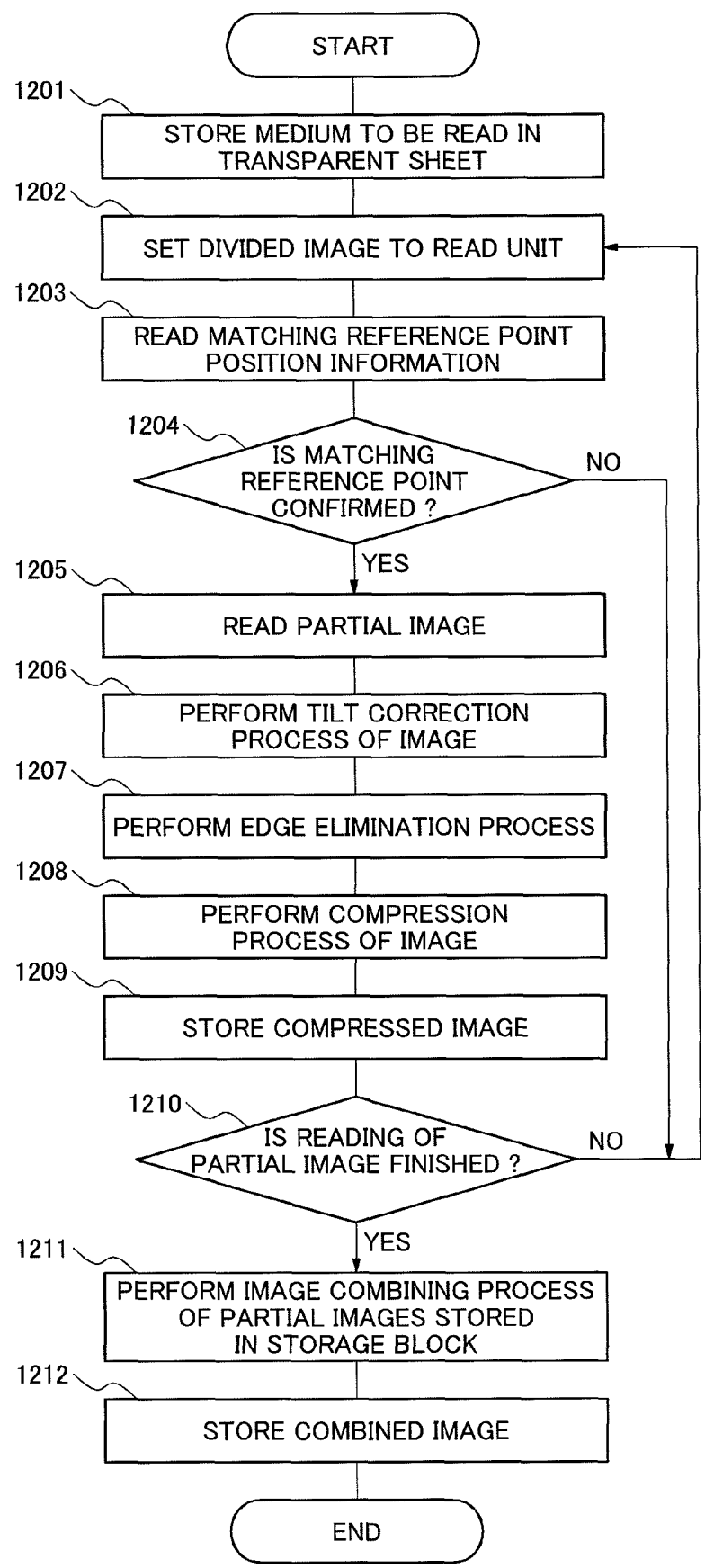
FIG. 12 is a flowchart showing an example of an operation of the image combining device according to the second exemplary embodiment.

FIG. 12 indicates an example of an operation of the image combining device according to the second exemplary embodiment. When the image reading device 304 is instructed to perform an image combining process, it performs the image combining process.

The medium to be read 908 is held in the transparent holder 907 (Step 1201), and the image reading process is started.

A part of the medium to be read 908 held in the transparent holder 907 is set on the read unit 812 as a virtually divided medium to be read (Step 1202). The first reading is performed, in which the matching reference point read section 802 of the read unit 812 detects positions of the matching reference points 909, and obtains position coordinates of the matching reference points as matching reference point location information (Step 1203). The matching reference point read section 802 judges whether or not information on the matching reference points 909 is included in the matching reference point location information (Step 1204). When the information on the matching reference points 909 is not included in the matching reference point location information ("NO" decision in step 1204), an instruction for placing the virtually divided medium to be read is issued again, and the process in Step 1202 is carried out. When the information on the matching reference points 909 is included ("YES" decision in step 1204), the image correction value calculation process section 803 calculates an angle between the above-mentioned virtually divided medium to be read and the read unit 812 according to the matching reference point location information, and calculates a correction value for correcting the tilt of the virtually divided medium to be read. The image correction value calculation process section 803 stores the correction value in the image correction value storage block 804. Next, the second reading is performed, in which the partial image read section 801 of the read unit 812 reads the virtually divided medium to be read, and generates a partial image, in which the virtually divided medium to be read and the matching reference points 909 around it are included (Step 1205).

The angle correction section 805 corrects the tilt of the partial image according to the correction value stored in the image correction value storage block 804, and generate a corrected partial image (Step 1206). In Step 1206, the angle correction section 805 associates information for discriminating the corrected partial image with the positions of the matching reference points 909 included in the corrected partial image, and stores them in the matching reference point position storage section 809. The matching reference point area edge elimination section 806 inserts the white image into the image area including the matching reference points 909 in the image area representing the corrected partial image in order to eliminate the matching reference points 909 in the combined image, and generates an edge elimination processed image (Step 1207). The partial image compression section 807 compresses the edge elimination processed image, and generate a compressed image (Step 1208). The partial image compression section 807 stores the compressed image in the partial image storage section 808 (Step 1209).

Another part of the medium to be read 908 held in the transparent holder 907 is set on the read unit 812 as the next virtually divided medium to be read ("NO" decision in step 1210), and when the reading of the image is further required, the process in step 1202 is carried out again. In order to obtain four divided partial images, the process in the above-mentioned step is performed further two times to read all four virtually divided media to be read.

When the four divided partial images are obtained and compressed images of the partial images of them are stored in the partial image storage section 808 ("YES" decision in step 1210), the image combining process section 810 decompresses the compressed image stored in the partial image storage section 808 as the edge elimination processed image. The image combining process section 810 performs an image combining process, in which the edge elimination processed images are combined by referring to the overlapping portion of the edge elimination processed images according to the position of the matching reference points 909 included in the corrected partial image stored in the matching reference point position storage section 809. Combined image including the medium to be read and the matching reference points 909 around it are generated (Step 1211). The image combining process section 810 stores the combined image in the combined image storage block 811 (Step 1212). The image combining process ends.

In the above-mentioned example, although the four divided partial images are combined, the number of division is not limited to four. Many divided partial images can be combined by repeating the same process.

The processes mentioned above can be performed by a computer system including a memory, and it can be controlled by a computer program which a CPU (Central Processing Unit) executes. The CPU reads the computer program from the holding portion when the computer is activated and executes it.

[Advantage]

By using the image reading device 304 in the image combining device according to the exemplary embodiment described in the above, a used memory area can be reduced by efficiently performing an image compression. In this case, it is desirable to perform a pre-reading of matching reference point location information and perform an image combining process according to this information.

In the image combining method disclosed by Japanese Patent Application Laid-open Publication No. 6-36009, a setting of reference points is manually performed by a user for each of original materials. Therefore, a user has to decide a suitable position for setting reference points by eye for each original. Accordingly, when the original in which a white area is small is used, it is difficult to set the reference points that can be easily discriminated. Therefore, this image combining method cannot be used as a general purpose method.

The image processing method disclosed by Japanese Patent Application Laid-open Publication No. 11-88655 requires a large memory capacity for storing data. Because the processing time of this image processing method is long, the method cannot be used by a small sized portable image processing device.

In the image division input method disclosed by Japanese Patent Application Laid-open Publication No. 2000-188675, a scanning process is added and a joint position is manually adjusted on image data. Therefore, burden and time required for its process are large in comparison with a method in which the joint position of the images is set based on the reference points.

As mentioned above, in the image combining device of the present invention, the matching reference points are marked to the edge portion of the transparent holder. Accordingly, in the image reading device, when the medium to be read held in the transparent holder is set on the read unit, the medium to be read held in the transparent holder is virtually divided into small blocks and each of the blocks is read. The control unit performs the image combining process and the edge elimination process mentioned above.

An exemplary advantage according to the invention is that, by performing these processes, the highly precise image combining can be performed.

The previous description of embodiments is provided to enable a person skilled in the art to make and use the present invention. Moreover, various modifications to these exemplary embodiments will be readily apparent to those skilled in the art, and the generic principles and specific examples defined herein may be applied to other embodiments without the use of inventive faculty. Therefore, the present invention is not intended to be limited to the exemplary embodiments described herein but is to be accorded the widest scope as defined by the limitations of the claims and equivalents.

Further, it is noted that the inventor's intent is to retain all equivalents of the claimed invention even if the claims are amended during prosecution.

What is claimed is:

1. An image combining device, comprising:
    a read unit, which includes:
        a transparent holder configured to hold a flat medium having a plurality of matching reference points marked in an edge region; and
        an image read section of flatbed type, configured to read said medium held in said transparent holder, through a reading window, a size of said medium being larger than a size of said reading window, and to generate a plurality of partial images, each of which includes an image of a part of said medium and a part of the plurality of matching reference points, the matching reference points being arranged along a part of an edge of the image of the part of said medium; and
    a control unit, configured to combine said plurality of partial images based on the matching reference points included in said plurality of partial images, and to generate a combined image including an image of said medium,
    wherein:
        said control unit comprises an image compressing section, configured to compress said plurality of partial images to generate compressed images, each of which includes compressed data obtained by compressing a group of data arranged in a first direction of said partial image, decompress a part of said compressed data of each of said compressed images, and combine decompressed data, obtained by decompressing a part of the compressed data, to generate the combined image, and
        the plurality of partial images arranged in said first direction are combined to generate said combined image.

2. The image combining device according to claim 1, wherein
    said control unit includes:
        a tilt correction section, which corrects a tilt of each of said plurality of partial images, and generates a plurality of corrected partial images;
        a partial image combining section, which combines said plurality of corrected partial images by referring to said matching reference points included in said plurality of corrected partial images; and
        an edge elimination section, which eliminates said matching reference points included in said combined image.

3. The image combining device according to claim 2, wherein
    said control unit includes:
        an image rotating section, which rotates each of said plurality of partial images by 90 degrees clockwise or counterclockwise, to combine said plurality of rotated partial images.

4. The image combining device according to claim 1, wherein
    each of virtually divided media, generated by virtually dividing said medium held in said transparent holder, includes an overlap region overlapping with an adjacent virtually divided medium, and
    said control unit combines said plurality of partial images by referring to the matching reference points included in said overlap region.

5. The image combining device according to claim 1, wherein
    the plurality of partial images arranged in a direction orthogonal to said first direction are combined to generate said combined image.

6. The image combining device according to claim 1, wherein
    said control unit reads a part of said plurality of matching reference points, and generates matching reference point location information, and
    said control unit moves at least one of said partial images to combine said partial images, based on said matching reference point location information.

7. An image combining method, to read a flat medium, a size of which is larger than a size of a reading window of an image read section of flatbed type, and to generate an image of said medium, the image combining method comprising:

storing said flat medium into a transparent holder, in which a plurality of matching reference points are marked in an edge region;

placing said transparent holder on said reading window;

reading said medium held in said transparent holder, to generate a plurality of partial images, each of which includes an image of a part of said medium and a part of the plurality of matching reference points, the matching reference points being arranged along a part of an edge of the image of the part of said medium; and combining said plurality of partial images based on the matching reference points included in said plurality of partial images, to generate a combined image including an image of said medium, wherein said combining comprises compressing said plurality of partial images to generate compressed images, each of which includes compressed data obtained by compressing a group of data arranged in a first direction of said partial image, decompressing a part of said compressed data of each of said compressed images, and combining decompressed data, which are obtained by decompressing a part of the compressed data, to generate the combined image, the plurality of partial images arranged in said first direction are combined to generate said combined image.

8. The image combining method according to claim 7, further comprising:

correcting a tilt of each of said plurality of partial images, to generate a plurality of corrected partial images;

combining said plurality of corrected partial images by referring to said matching reference points included in said plurality of corrected partial images; and eliminating said matching reference points included in said combined image.

9. The image combining method according to claim 7, further comprising:

rotating each of said plurality of partial images by 90 degrees clockwise or counterclockwise, to combine said plurality of rotated partial images.

10. The image combining method according to claim 7, further comprising:

virtually dividing said medium held in said transparent holder into an plurality of virtually divided media, each of the virtually divided media including an overlap region overlapping with an adjacent divided medium; and combining said plurality of partial images by referring to the matching reference points included in said overlap region.

11. The image combining method according to claim 7, further comprising:

the plurality of partial images arranged in a direction orthogonal to said first direction are combined to generate said combined image.

12. The image combining device according to claim 7, further comprising:

reading a part of said plurality of matching reference points, to generate matching reference point location information; and moving at least one of said partial images to combine said partial images, based on said matching reference point location information.

13. A transparent holder, to hold a flat medium, a part of which is read by an image read section of flatbed type, a size of said flat medium being larger than a size of a reading window of the image read section, the transparent holder comprising:

a plurality of matching reference points in an edge region, wherein:

a plurality of partial images are generated, each of which includes an image of the part of said medium and a part of the plurality of matching reference points, the matching reference points are arranged along a part of an edge of the image of the part of the medium, said plurality of partial images are combined based on the matching reference points included in said plurality of partial images, to generate a combined image including an image of said medium, said combining comprises compressing said plurality of partial images to generate compressed images, each of which includes compressed data obtained by compressing a group of data arranged in a first direction of said partial image, decompressing a part of said compressed data of each of said compressed images, and combining decompressed data, which are obtained by decompressing a part of the compressed data, to generate the combined image, and the plurality of partial images arranged in said first direction are combined to generate said combined image.

14. An image combining device, comprising:

a holding means for holding a flat medium, a plurality of matching reference points marked in an edge region;

image reading means for reading said medium held in said holding means placed on a reading window, a size of said medium being larger than a size of said reading window, and for generating a plurality of partial images, each of which includes an image of a part of said medium and a part of the plurality of matching reference points, the matching reference points being arranged along a part of an edge of the image of the part of said medium; and control means for combining said plurality of partial images based on the matching reference points included in said plurality of partial images, and for generating a combined image including an image of said medium, wherein:

said control means includes an image compressing means for compressing said plurality of partial images to generate compressed images, each of which includes compressed data obtained by compressing a group of data arranged in a first direction of said partial image, decompressing a part of said compressed data of each of said compressed images, and combining decompressed data, which are obtained by decompressing a part of the compressed data, to generate the combined image, and the plurality of partial images arranged in said first direction are combined to generate said combined image, and said combined data is compressed.

15. A non-transitory computer readable storage medium for storing a program, which causes a computer to execute a process to generate an image of a flat medium, a size of which is larger than a size of a reading window of an image read section of a flatbed type, the process comprising:

generating a plurality of partial images, each of which includes an image of a part of said flat medium and a part of a plurality of matching reference points, the matching reference points being marked in an edge region of a transparent holder, which holds said flat medium and is placed on said reading window, and the matching reference points being arranged along a part of an edge of the image of the part of said flat medium; and combining said plurality of partial images based on the matching reference points included in said plurality of partial images, to generate a combined image including the image of said flat medium, wherein:

said combining comprises compressing said plurality of partial images to generate compressed images, each of which includes compressed data obtained by compressing a group of data arranged in a first direction of said partial image, decompressing a part of said compressed data of each of said compressed images, and combining decompressed data, which are obtained by decompressing a part of the compressed data, to generate the combined image, and the plurality of partial images arranged in said first direction are combined to generate said combined image.

* * * * *

UNITED STATES PATENT AND TRADEMARK OFFICE
CERTIFICATE OF CORRECTION

| | | |
|---|---|---|
| PATENT NO. | : 8,760,735 B2 | Page 1 of 1 |
| APPLICATION NO. | : 12/402645 | |
| DATED | : June 24, 2014 | |
| INVENTOR(S) | : Takuma Aoshima | |

It is certified that error appears in the above-identified patent and that said Letters Patent is hereby corrected as shown below:

Title Page, Item (75) Inventor: Delete "Kakegawa (JP)" and insert -- Kakegawa-shi (JP) --

In the Specification

Column 3, Line 46: Delete "a an" and insert -- an --

Column 8, Line 10: Delete "parallel:" and insert -- parallel --

In the Claims

Column 21, Line 55: In Claim 12, delete "device" and insert -- method --

Signed and Sealed this
Twenty-first Day of April, 2015

Michelle K. Lee
*Director of the United States Patent and Trademark Office*